(12) United States Patent
Ward et al.

(10) Patent No.: US 6,208,914 B1
(45) Date of Patent: Mar. 27, 2001

(54) SYSTEM FOR IMPROVED RECEDING-HORIZON ADAPTIVE AND RECONFIGURABLE CONTROL

(75) Inventors: David G. Ward, Earlysville; Jeffrey F. Monaco, Charlottesville; Roger L. Barron, Stanardsville; Rebecca A. Bird, Earlysville, all of VA (US)

(73) Assignee: Barron Associates, Inc., Charlottesville, VA (US)

( * ) Notice: Subject to any disclaimer, the term of this patent is extended or adjusted under 35 U.S.C. 154(b) by 0 days.

(21) Appl. No.: 08/972,946

(22) Filed: Nov. 19, 1997

Related U.S. Application Data

(60) Provisional application No. 60/031,418, filed on Nov. 21, 1996.

(51) Int. Cl.⁷ ............................................... G06F 17/00
(52) U.S. Cl. ...................................... 701/3; 701/4
(58) Field of Search ................................ 701/3, 4, 8, 10; 244/17.13, 164

(56) References Cited

U.S. PATENT DOCUMENTS

| | | | |
|---|---|---|---|
| 5,025,381 | 6/1991 | Goodzeit et al. | 701/4 |
| 5,901,059 | 5/1999 | Tao et al. | 364/149 |

OTHER PUBLICATIONS

Ward, D.G., R.L. Barron, M.P. Carley, T.J. Curtis, "Real time parameter identifcation for self–designing flight control," *Proc.1994 National Aerospace Electronics Conf.*, Dayton, OH, vol. 1, pp. 526–531, May 23–27, 1994.

Barron, R.L., E.C. Larson, D.G. Ward, J.W. Stayman "Analytical control synthesis for adaptive flying–qualities adherence," *Proc.1995 National Aerospace Electronics Conf.*, Dayton, OH, vol. 1, pp. 523–530, May 22–26, 1995.

Ward, D.G., R.L. Barron, "A self–designing receding horizon optimal flight controller," *Proc.1995 American Control Conf.*, Seattle, WA, vol. 5, pp. 3490–3494, Jun. 21–23, 1995.

Bodson, M., "An adaptive algorithm with information–dependent data forgetting," *Proc.1995 American Control Conf.*, Seattle, WA. vol. 5, pp. 3485–3489, Jun. 21–23, 1995.

Ward, D.G., J.F. Monaco, R.L. Barron, R.A. Bird, Y.–J.P. Wei, *Neural Network Flight Control Systems*, Barron Assoc. Inc. Final Technical Rpt., Contract F33615–93–C–3612, Flight Dynamics Directorate,Wright Lab.Air Force Material Command,Wright–Patterson AFB, OH, WL–TR–96–3052, Feb. 1996.

(List continued on next page.)

*Primary Examiner*—Tan Nguyen
(74) *Attorney, Agent, or Firm*—Jay M. Cantor

(57) ABSTRACT

A system for adaptive and reconfigurable control of aircraft and other complex objects and processes, herein referred to collectively as controlled "plants." A modified form of sequential least-squares estimation is used to obtain near-real-time estimates of the values of plant parameters. The parameter estimates are used in a novel piecewise-linear optimal receding-horizon sampled-data controller in which internal controller parameters, known in the art as Riccati gains, are propagated from their current values using the most recent plant parameter estimates. This method of updating Riccati gains is a major departure from the prior art in receding-horizon control, where the Riccati gains (or equivalent) are re-initialized at each control update using terminal boundary conditions. The present invention provides improved robustness of control, lessened need for re-tuning control-effort penalties when operating conditions change, and significantly reduced computational burden. The control system of this disclosure is suitable for on-line adaptation to changing plant and control effector parameter values, including possible large and abrupt changes requiring controller reconfiguration for damage to or malfunction of the plant and/or control effectors.

4 Claims, 3 Drawing Sheets

OTHER PUBLICATIONS

Ward, D.G., R.L. Barron, J.F. Monaco, Y.–J.P. Wei, T.J. Molnar, "Agile Receding–Horizon Optimal Control Law Using Neural Models of Stability and Control Derivatives and On–Line Parameter Identification," Paper Presented at *High–Angle–of–Attack Technology Conf.*, NASA Langley Research Center, Hampton, VA, Sep. 17–19, 1996.

Ward, G., J.F. Monaco, R.L. Barron, RA. Bird, J.C. Virnig, T.F. Binder, *Self–Designing Controller: Design, Simulation, and Flight Test Evaluation*, Barron Assoc., Inc. Final Technical Rept, Contract F49620–94–C–0087, Flight Dynamics Directorate, Air Force Material Command,Wright–Patterson AFB, OH. (Draft submitted Nov. 13, 1996; unpublished as of this writing.).

Monaco, J.F., D.G. Ward, R.L. Barron, R.A. Bird, Implementation and flight test assessment of an adaptive, reconfigurable flight control systems, *Proc. 1997 Guidance, Navigation, and Control Conf.*, American Institute of Aeronaujtics and Astronautics, New Orleans, LA, vol.3, pp. 1443–1454, Aug. 11–13, 1997.

"Self–repairing flight control system," USAF Wright Laboratories Technical Report, McDonnell Douglas Aerospace (Month/Year is not available).

J.G.M. Bodson, "Multivariable adaptive algorithms for reconfigurable flight control," in *Proc.1994 Confnce on Decision and Control*, (Lake Buena Vista,FL). Dec.1994.

"Intelligent flight control system," tech.rep., NASA Ames, NASA Dryden, and McDonnell Douglas Aerospace. (Month/Year is not available).

C. Garcia & D. Prett, "Model predictive control:Theory and practice—a survey," *Automatica*, vol. 25, pp. 335–348, 1989.

H. Michalska & D. Mayne, "Robust receding horizon control of constrained nonlinear systems," vol. 38, pp. 1623–1633, Nov. 1993.

M. Prachter, P. Chandler & M. Mears, "Modeling and control of velocity vector rolls." Unpublished Draft Paper, 1995.

D. R. Barron, R. Bird & J. Monaco, "NNFCS design and non–piloted simulation evaluation," Interim Technical Rpt for WL Flight Dynamics Directorate, Contract F33615–93–C–3612, Barron Associates, Inc. Dec. 1994.

D. Ward & R. Barron, "Self–designing flight control using modified sequential least squares parameter estimation and optimal receding horizon control laws," Final Tech. Rep. for AFOSR, Contract F49620–93–C–0044 Barron Associates, Inc., Mar., 1994.

H. Michalska, Personal Conversation.

Y. Wei & D. Bodden, Neural Network Flight Control System for high–agility air combat: Final Presentation, Dec. 1995.

J.C.W.S. Bittanti, A.J. Laub, *The Riccati Equation*, New York, N.Y: Springer–Verlag, 1991.

T. Soderstrom & P. Stoica, *System Identification*, Englewood Cliffs, NJ: Prentice Hall, 1989.

V. Cherkassky, J. Friedman & H. Wechsler, *From Statistics to Neural Networks, Theory and Pattern Recognition* Applications, Berlin: Springer–Verlag, 1993.

L. Ljung & T. Soderstrom, *Theory and Practice of Recursive Identification*, Cambridge, MA: MIT Press, 1983.

G. Seber & C. Lee, *Advances in Neural Information Processing Systems*. New York, NY: Wiley & Sons, 1989.

R. Bitmead, M. Gevers & V. Wertz, *Adaptive Optimal Control*. Englewood Cliffs, NJ: Prentice Hall, Inc. 1990.

B. Anderson & J. Moore, *Optimal Control: Linear Quadratic Methods*. Englewood Cliffs, NJ: Prentice Hall International, 1989.

P. Chandler, M. Pachter & M. Mears, "System identification for adaptive and reconfigurable control," *Guidance, Control, and Dynamics*, vol. 18, pp. 516–524, 1995.

W. Kwon and A. Pearson, "On feedback stabilization of time–varying discrete linear systems," in *Trnas. on Automatic Control, IEEE*, vol. 23, pp. 479–481, 1978.

U.S. Dept. of Defense, "MIL–SID–1797A, *Military Standard: Flying Qualities of Piloted Aircraft*," Jan. 30, 1990.

SYSTEM FOR IMPROVED RECEDING-HORIZON ADAPTIVE AND RECONFIGURABLE CONTROL

CROSS REFERENCE TO RELATED APPLICATIONS

This application claims priority under 35 USC § 119 (e) (1) of provisional application Ser. No. 60/031,418, filed Nov. 21, 1996, the contents of which are incorporated herein by reference.

BACKGROUND OF THE INVENTION

1. Field of the Invention

This invention relates to a system and method for receding-horizon adaptive and reconfigurable control.

2. Brief Description of the Prior Art

It has long been a goal of flight-control research to achieve first-rate flying qualities for military aircraft across constantly expanding operational envelopes of altitude, Mach number, angle of attack, maneuver accelerations, and stores configurations. Simultaneously, there has been an interest in reducing the time and cost for developing new flight control systems. In recent years, attention has also focused on flight-control system robustness, i.e., the ability to operate well under off-nominal or unexpected conditions. The emphasis on robustness has led, logically, to studies of reconfigurable control, which is intended to adapt quickly to control surface malfunctions, effector impairments, or damage to the aircraft, as well as less traumatic events such as release of stores or gradual component-hardware aging.

The often conflicting objectives of improved aircraft performance and lowered cost have focused attention on the flight-control discipline because control-system development can be costly, particularly with short aircraft production cycles. To hand-tailor flight-control designs to meet desired flying-qualities requirements over all flight conditions in the operational envelopes of high-agility aircraft typically involves multiple design iterations.

It also becomes a challenge to create reliable algorithms to reconfigure flight-control systems quickly and effectively should impairments occur. Traditional control synthesis methods are tedious, requiring specialized knowledge, substantial off-line analysis, and extensive in-flight validation (often accompanied by numerous iterations of large and complex pre-specified gain schedules). These difficulties are compounded when one attempts to design for the large universe of possible anomalies that may be experienced during the flight-vehicle service life. Many reconfigurable control design methods attempt to compensate for potential impairments and off-nominal operating conditions by combining multiple highly-specialized off-line designs with on-line failure detection algorithms. If and when a specific class of failure is isolated, a separate control system, designed to compensate for the given failure, is invoked and used thereafter.

Rather than rely on numerous control system implementations based on pre-hypothesized impairment or airframe damage scenarios, a number of researchers have been developing reconfigurable controllers based on adaptive control techniques. Many of these are direct-adaptive approaches whereby control gains are adjusted based on system performance. Recently, however, a number of researchers have been investigating indirect-adaptive control approaches whereby a modern control law and on-line parameter identification algorithm are designed independently. Such approaches, while requiring the identification of many parameters, can leverage existing and future research in the areas of optimal model-following control and robust parameter identification.

Whereas many control applications are focused on achieving desired steady-state responses, flight control is interested in optimal transient response. Model predictive control (MPC) is well suited to achieve these transient performances.

Model predictive control was originally developed in the process controls industry under a variety of names, the most common of which is generalized predictive control (GPC). There are a number of variations of GPC methodologies, including discrete and continuous time versions, tracking formulations, and adaptive algorithms that combine the GPC algorithm with an on-line system identification technique. However, all of the variants work in very much the same way. First, a finite time optimal control solution is computed using a quadratic cost function, a model of the current plant dynamics, the current system states, and a model of the desired plant response over the horizon. Once the open-loop sequence of optimal control commands are determined, the first command, corresponding to the current time, is applied to the system. At the next control update, rather than applying the second command in the open-loop optimal command sequence, the finite horizon optimization is completely redone using a new estimate of the plant dynamics, current system states, and desired control. In this way, the open-loop finite-horizon optimal control problem becomes a closed loop problem, and the optimization horizon is said to "recede" because the controller never applies the commands corresponding to the end of the horizon.

A model predictive controller shares a number of advantages with linear quadratic (LQ) control techniques, especially stability and robustness. However, unlike infinite-time LQ control, a receding-horizon controller can anticipate desired plant responses and better account for time-varying plant characteristics. These two qualities make this approach extremely attractive for a number of multi-input multi-output (MIMO) control problems where one is interested in achieving desired transient responses. In fact, it has recently been argued that, for problems that are not inherently linear-time-invariant (LTI), receding-horizon control is the only viable controller synthesis method.

Due to the computational complexity of MPC, MPC has been most successfully applied to processes, such as chemical process control, where slow update rates are allowed for the control computations. Recently, however, with advances in computing technology, MPC-type controllers have been applied to aerospace applications. An adaptive version of receding-horizon optimal (RHO) (RHO refers to the particular receding-horizon controller developed for inner-loop flight control) control has been derived and applied to MIMO three degrees-of-freedom (3DOF) inner-loop aircraft control. In the aeronautical context, the RHO control law accounts for plant nonlinearities by linearizing the aircraft equations of motion at each instant in time and deriving the finite-horizon optimal control strategy for the linearized plant dynamics. Thus, time-varying nonlinear plants are converted to time-varying linear plants, enabling the on-line closed-form derivation of a robust control strategy. Such a strategy is also extremely well suited for reconfigurable control when combined with on-line system identification. Under a recent program, (Neural Network Flight Control System for High-Agility Air Combat) real-time piloted simulations were used to show that an RHO control law can effectively account for plant nonlinearities that occur during high-angle-of-attack and post-stall maneuvering such as velocity vector rolls.

However, the need exists for adaptive and reconfigurable control of aircraft and other complex objects and processes such as, without limitation thereto, chemical plants, electrical power distribution networks, and machines for positioning and locomotion of loads. These complex objects and processes, including their control effectors, will be referred to herein categorically as "plants." In the technical control of many such plants, the major needs are:

1. maintain close tracking of varying input commands or changing set points, including commands computed via input reference models;
2. adapt to changing properties of the plant; in particular, adapt the control law rapidly (reconfigure) for damage or malfunctions of the plant;
3. maintain stability under all conditions, including displacement and/or rate saturation of effectors;
4. optimally allocate control authority among multiple effectors in the context of multi-loop control objectives;
5. minimize costs of control system ownership and operation via reducing design efforts and control law tuning, optimizing use of control energy, achieving survivability under many conditions of plant damage and/or malfunction, realizing faster/more accurate command tracking, and providing economical implementation of the control law.

Indirect adaptive control can achieve many of these objectives. However, for complex processes, there are a number of technical challenges. These are:

1. The number of parameters that must be identified by an indirect adaptive controller is greater than that required by direct adaptive controllers. However, most real-time parameter identification techniques (e.g., Recursive Least Squares, Kalman Filter, etc.) break down due to data collinearities that arise as a result of state feedback, effector ganging, and long periods of straight and level flight.
2. Optimal control approaches, such as linear quadratic regulator (LQR), linear quadratic Gaussian (LQG), and $H_\infty$ optimize over an infinite time horizon and, thus, concentrate on controlling the steady-state characteristics of the closed-loop system. As such, there is an inherent phase-lag in the transient response, and they cannot provide effector commands that anticipate the desired response.
3. Pure multi-input multi-output receding-horizon control approaches, such as MPC and GPC, require numerous and computationally expensive integrations of Riccati differential or Riccati difference equations (or computation and solution of the Diophantine equations).

The prior art teaches a rigorous theory for two-point boundary-value optimal control. The realization of practicable systems implementing this theory has proven difficult because of the extensive computational burdens imposed by the theory.

With reference to initial-value control, it has been proposed that costate differential equations be continuously integrated forward along with the application of effector commands that are likewise derived from the Euler-Lagrange necessary conditions of the variational calculus. It also has been proposed that high-pass filtering of the costate time-variations be used to ensure the long-term stability of the costates while preserving their transient integrity. The compromise in that proposal is to ignore application of the transversality conditions and solve instead an initial-value problem.

SUMMARY OF THE INVENTION

In accordance with the present invention, the rigorous theory for two-point boundary-value optimal control theory is compromised in a judicious manner not evident to prior practitioners. In this invention, the back-integration of Riccati gains taught in the rigorous theory is modified so as to reduce substantially the computing load with inconsequential sacrifice in performance of the control system.

In addition, in accordance with the present invention, the transversality conditions of the calculus of variations are imposed, and a form of two-point boundary-value optimization is realized. The compromise used has less impact on the character of the optimum solution, while greatly reducing the burdens of realization.

Two key enabling concepts and associated technologies are provided that solve the problems enumerated above. These are (1) modified sequential least squares (MSLS) parameter identification and (2) modified receding-horizon optimal (RHO) control. MSLS is a computationally efficient parameter identification (estimation) technique that uses two types of regularization that enable it to provide accurate estimates even during periods of data collinearities. The RHO control strategy, like an MPC controller, is designed to track an analyst-specified model of the desired system response. However, unlike MPC (and like LQ), RHO leverages information from prior updates to reduce significantly the computational cost of the current control update.

The unique characteristics of the modified RHO controller are:

1. The receding-horizon Riccati gains are initialized with the approximations of the infinite horizon values (these are functions of operating conditions only).
2. A very short horizon is used, and it is assumed that the desired response is constant throughout the horizon.
3. The Riccati gains are integrated away from the available desired steady-state values toward the optimal tracking solution, taking as many Riccati steps as the available computer time allows (typically between 0.5 and 10.0).
4. At each control update,
   (a) the current values of the Riccati gains are used to compute the control command,
   (b) the desired plant response being used by the Riccati equations is updated, and
   (c) integration of the Riccati equations is continued from the current gain set (i.e., the system does not reset them using the variational calculus transversality conditions).
5. If an actuator begins to saturate (rate or position), the penalty for using this actuator is increased. This is done carefully to avoid unwanted oscillations.

The differences between standard MPC and the modified RHO approach in accordance with the present invention are illustrated in FIGS. 1 and 2. In standard MPC, as illustrated in FIG. 1, an optimal tracking problem is formulated, and either Riccati equations (or the Diophantine equations) are used to find the sequence of optimal control commands throughout the horizon. These equations must be integrated backward in time from the end of the optimization horizon to the current time to obtain the current Riccati gains, and from these, the current optimal control command. At each control update, the Riccati equations are completely reset, and a new optimization problem is solved using the current system states and estimates of the system parameters. It is the integration of the Riccati equations (or solution of the Riccati equations) at each step that is computationally intensive.

In the modified RHO procedure, as illustrated in FIG. 2, an optimal tracking problem is provided (as with standard RHO) However, during the on-line solution of the Riccati equations, these equations are allowed to continue integrating (without being reset) using the most up-to-date plant parameters available. Thus, there is no need to integrate over a horizon before a control command can be computed. If the desired response were constant, and if the parameters were constant, the gains would converge to optimal LQ gains. However, the desired response and plant parameters are not constant. Thus, the modified RHO is a hybrid between LQ and MPC control. An additional feature of the modified RHO controller is a continuous monitoring of the actuators and adjustment of the optimization penalty weights to discourage rate or position saturation.

The relationship between modified RHO and LQ can be understood by hypothesizing an adaptive LQ controller in which a set of Riccati equations is derived to solve the infinite-time regulation problem. Such a controller, demonstrated in FIG. 3, continuously integrates its Riccati equations using the most up-to-date plant parameters available. After sufficient iterations, the system converges to the infinite-time steady-state LQR gains and these gains adapt as the plant parameters change (the rate of adaptation depends on the speed with which the infinite-time Riccati equations can be integrated). Typically, if one were concerned with computational expense, one would use algorithms besides the Riccati equations (such as a doubling algorithm). However, unlike the Riccati equations, these algorithms do not allow the plant parameters to be changed from one update to the next. Thus, the solution must be obtained from scratch at each update, resulting in computational complexities similar to MPC.

The optimal control algorithm requires estimates of the airframe and effector parameters. These are, in principle, obtainable from "look up" table representations, but much more preferable representations in terms of computer memory, computational throughput, and smoothness of estimates are (1) compact function approximators (a priori estimation functions) e.g., polynomial neural networks, (2) on-line estimation of airframe aero-inertial parameters and effector sensitivities, or (3) hybrid strategies. The task is to choose the most appropriate method for determining these airframe and effector parameters, given the nature of the function(s) the controller must perform. For real-time, adaptive, and reconfigurable control of a complex, nonlinear multi-input, multi-output plant, the second or third options are attractive approaches. Whereas the first approach relies entirely on a priori knowledge of the fundamental parameters and the state of the system used to generate these derivatives, the second and third methods, when properly formulated, are able to identify plant parameters on-line and in real time even in the event of abrupt changes owing to airframe damage, effector impairments, or combinations thereof. The MSLS parameter identification algorithm is suitable for robust on-line identification of unknown and time-varying parameters. Additionally, the algorithm can, if desired, incorporate and exploit a priori information.

There are two significant difficulties with on-line estimation of aircraft stability and control derivatives: (1) data collinearities and (2) time-varying parameters.

Data collinearities occur when any of the input variables to a system being identified can be represented as linear combinations of other input variables. Such conditions can be caused by:

1. cruise flight conditions where the surface and state commands are essentially constant for extended durations of time,
2. constant linear state feedback where the effector commands are linear combinations of the states, or
3. controllers that use "ganged" effectors (e.g., combine both asymmetric flap and asymmetric tail to generate rolling moment).

These collinearities are all cases of insufficient excitation and lead to singularities in the regression equations. Parameter identification is impossible with correlated inputs, and during periods of insufficient excitation, one typically ceases adaptation or extends the data-collection window back far enough to reduce data correlations.

Time-varying parameters result from changes in flight condition (slow variations) or during impairment, stores release, or other abrupt changes (fast variations). If the parameters are slowly varying, one can incorporate a forgetting factor in Recursive Least Squares (RLS) estimation or increase the size of the parameter variance model.

DESCRIPTION OF THE PREFERRED EMBODIMENT

Referring again to FIG. 1, there is shown prior art MPC control for aircraft wherein Riccati equations, which are a set of differential equations used to find the optimal control solution, are initialized by providing initial parameters thereto in well known manner. The initialized Riccati equations are then integrated in conjunction with the computed desired aircraft response (e.g., translation to an input of an action by the pilot, such as pull back of the stick). This information, along with estimated stability derivatives and estimated control derivatives is required to integrate the Riccati equations. If the horizon (e.g., completion of the operation being undertaken) has not been reached, the Riccati equations are again periodically integrated in conjunction with updated estimates of stability derivatives and updated estimates of control derivatives until the horizon has been reached. At this time, Lagrange multipliers and control commands are computed from the integrated Riccati equations and provide the actual command to be performed such as, for example, actual alteration of aircraft geometry, and the initial Riccati gains are reset for another iteration.

Figure 1:
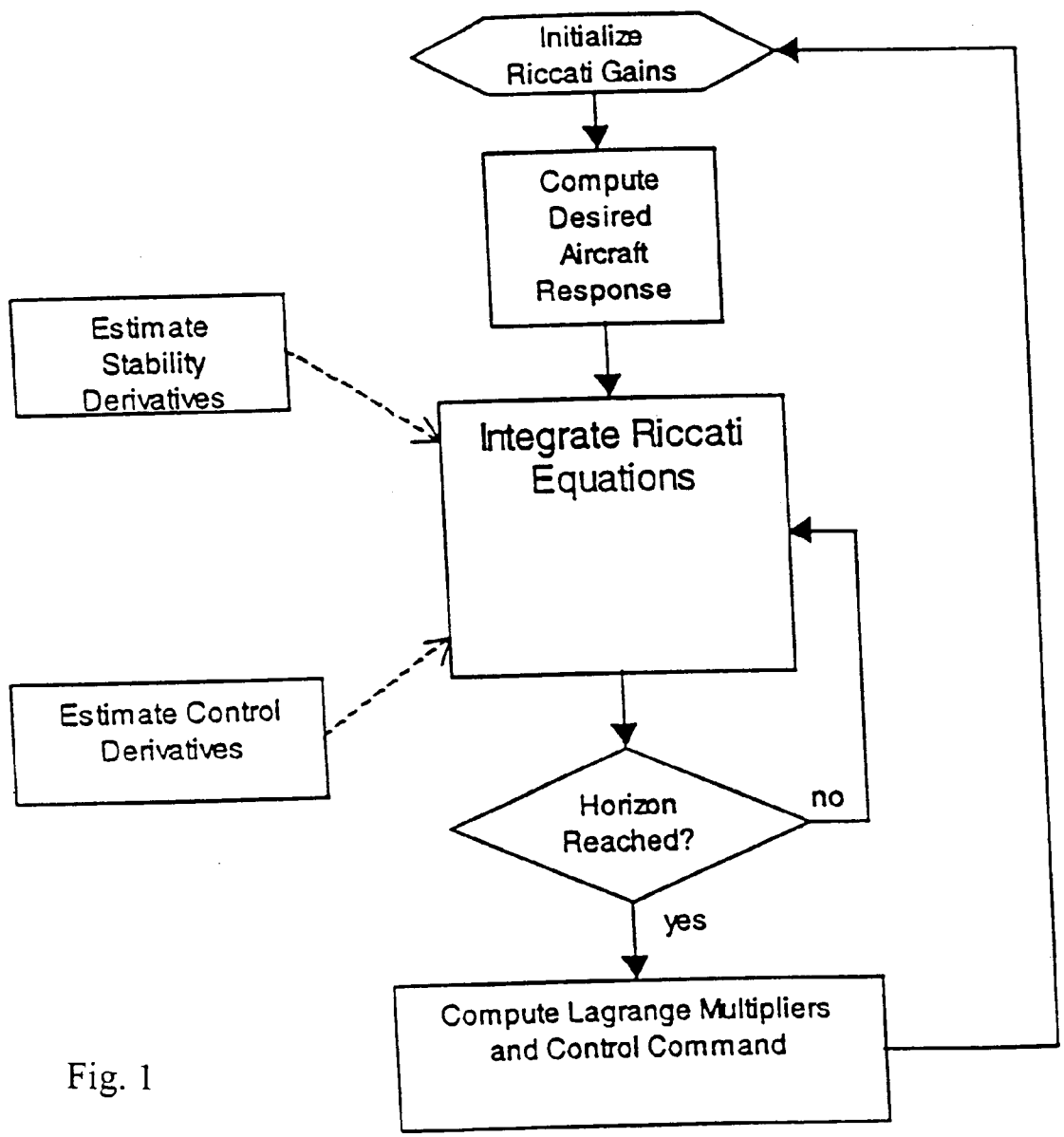
FIG. 1 is a flow chart showing MPC control in accordance with the prior art.
Figure 2:
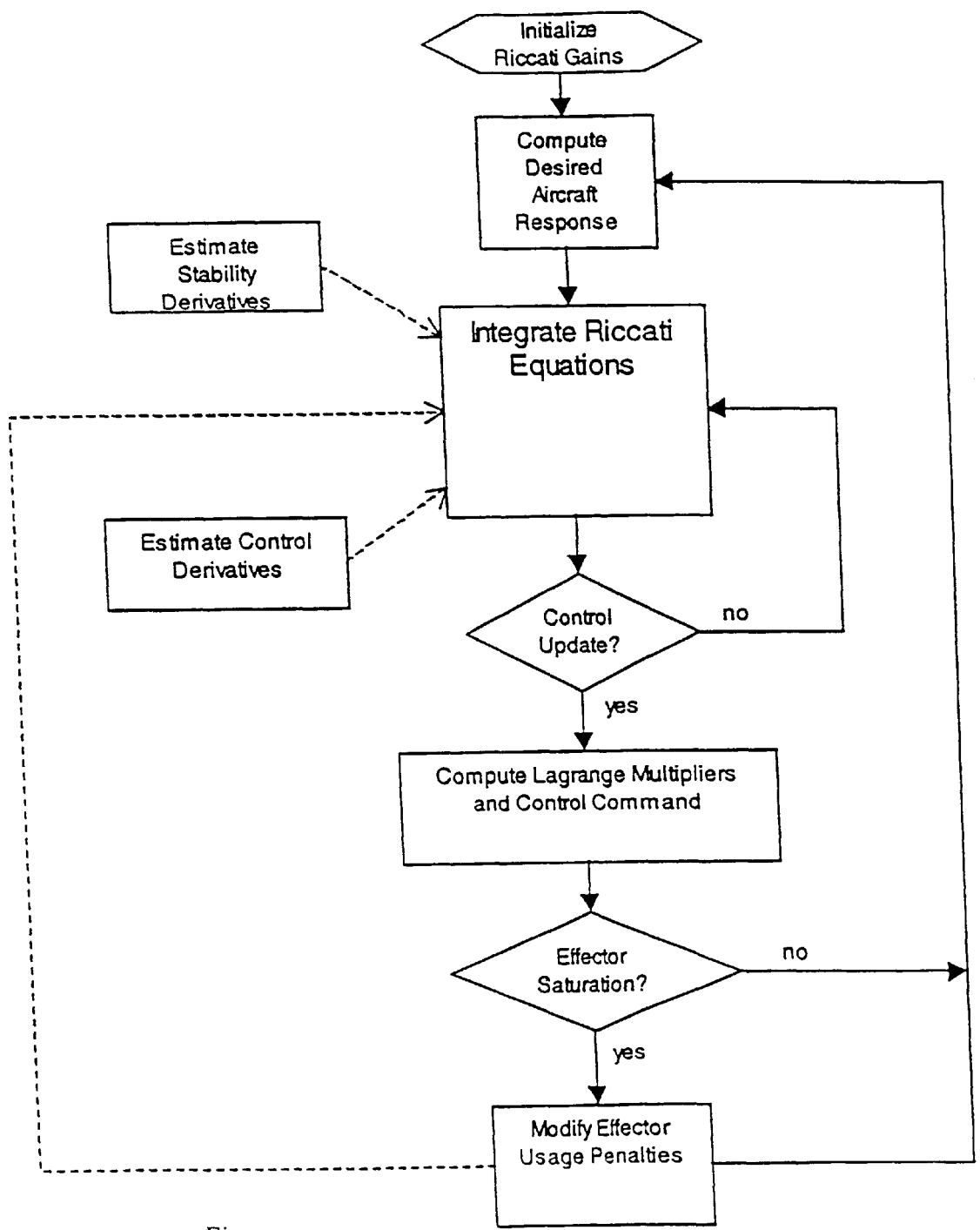
FIG. 2 is a flow chart showing modified RHO control in accordance with the present invention.

Referring to FIG. 2 wherein like boxes refer to the same or similar functions as set forth in FIG. 1, and in accordance with the present invention, the system of the prior art has been altered in at least two important ways, and the actual command to be performed is provided without reference to an horizon with the actual command being provided on-line constantly. In accordance with this embodiment, once the initialized Riccati equations are provided as in the prior art, the remaining control takes place without alteration of the initialized Riccati equations. The Riccati equations are reintegrated in conjunction with recomputed aircraft response at a predetermined rate determined by the control update. The recomputed aircraft response results from the same computation of Lagrange multipliers and control command as in the prior art as shown in FIG. 1, and this recomputation is used to alter the computed aircraft response provided in conjunction with the Riccati integration as well as to perform control on the plant, such as aircraft geometry. However, in the event the control to be performed provides effector saturation (i.e., is attempting to do more than that which the equipment is capable of achieving), a feedback signal is also provided to another set of parameters in the Riccati equations integration to alter the output from these equations to provide an achievable result or a result which is closer to being achievable.

Figure 3:
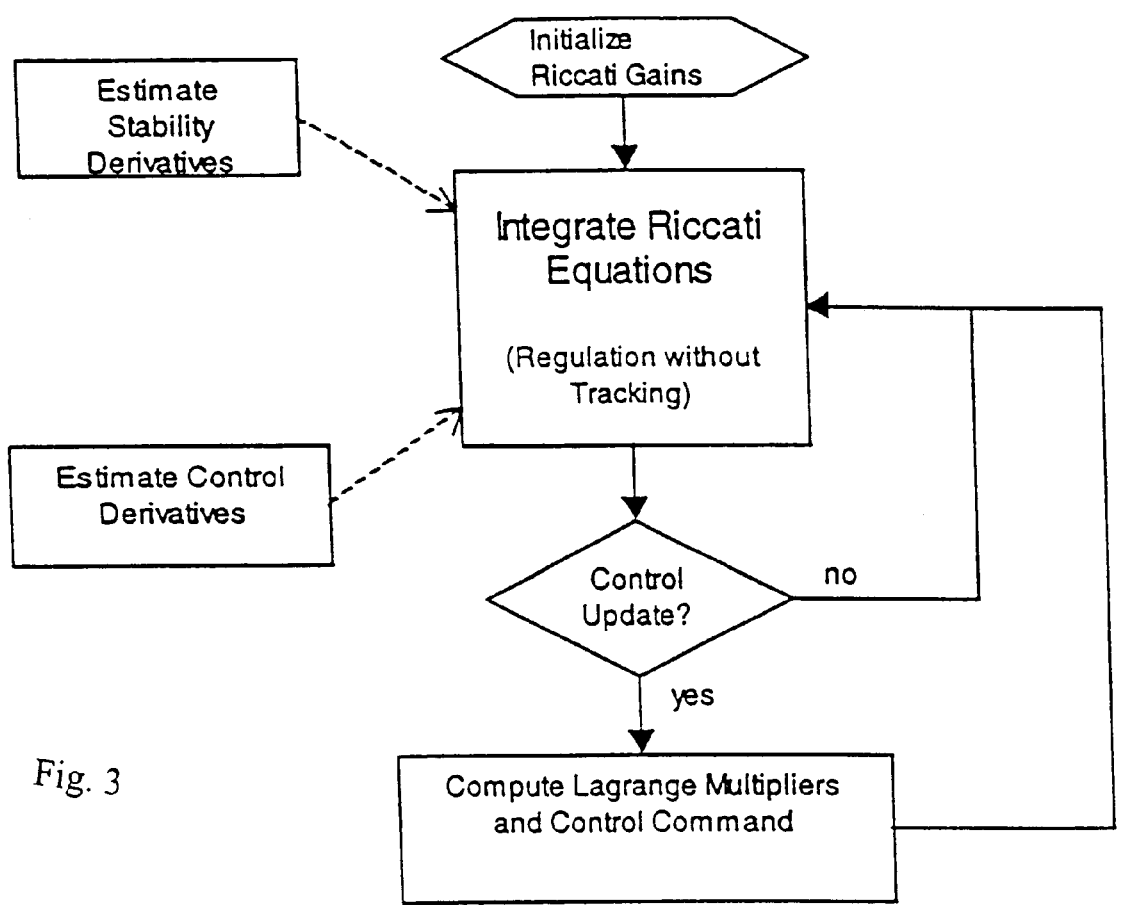
FIG. 3 is a flow chart showing an adaptive LQ control in accordance with the present invention.

Referring now to FIG. 3, the problem is solved using an infinite horizon rather than a receding-horizon, which means that the Riccati equations are different from those used in conjunction with FIG. 2 and that regulation takes place without tracking of the desired aircraft response. All control is based upon the initialized Riccati equations provided ab initio. The Riccati equations are continually integrated without being initialized after commencement of operation.

Though the invention has been described with reference to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A control method which comprises the steps of:
   (a) providing a plant;
   (b) integrating initialized Riccati equations modified by desired plant response;
   (c) periodically altering the desired response and reintegrating said Riccati equations;
   (d) computing Lagrange multipliers and control command signals from said integrated Riccati equations to provide said modified desired plant response; and
   (e) altering said plant in response to the computed command signals.

2. The method of claim 1 further including the step of determining whether the computed Lagrange multipliers and control command signals provide saturation and modifying said Riccati equations in response to a determination of saturation.

3. A control method which comprises the steps of:
   (a) providing a plant;
   (b) integrating initialized Riccati equations modified by desired plant response;
   (c) periodically altering the desired response and reintegrating said Riccati equations;
   (d) providing signals indicative of said modified desired plant response;
   (e) altering said plant in response to the said signals;
   (f) determining whether the computed Lagrange multipliers and control command signals provide saturation; and
   (g) modifying said Riccati equations in response to a determination of saturation.

4. A control method which comprises the steps of:
   (a) providing a plant;
   (b) integrating initialized Riccati equations;
   (c) computing Lagrange multipliers and control command signals for said integrated Riccati equations;
   (d) altering said Riccati equations in response to said step of computing; and
   (e) altering said plant in response to said step of computing.

* * * * *

UNITED STATES PATENT AND TRADEMARK OFFICE
CERTIFICATE OF CORRECTION

PATENT NO. : 6,208,914 B1
DATED : March 27, 2001
INVENTOR(S) : David G. Ward et al.

It is certified that error appears in the above-identified patent and that said Letters Patent is hereby corrected as shown below:

<u>Column 1,</u>
Line 11, before "BACKGROUND OF THE INVENTION" insert
-- FEDERALLY SPONSORED RESEARCH
This invention was made with Government support under contract F49620-94-C-0087 awarded by the Air Force. The Government has certain rights in this invention. --.

Signed and Sealed this

Sixth Day of June, 2006

JON W. DUDAS
*Director of the United States Patent and Trademark Office*